W. AND M. GOODWIN.
VALVE.
APPLICATION FILED FEB. 10, 1920.
1,375,585.
Patented Apr. 19, 1921.
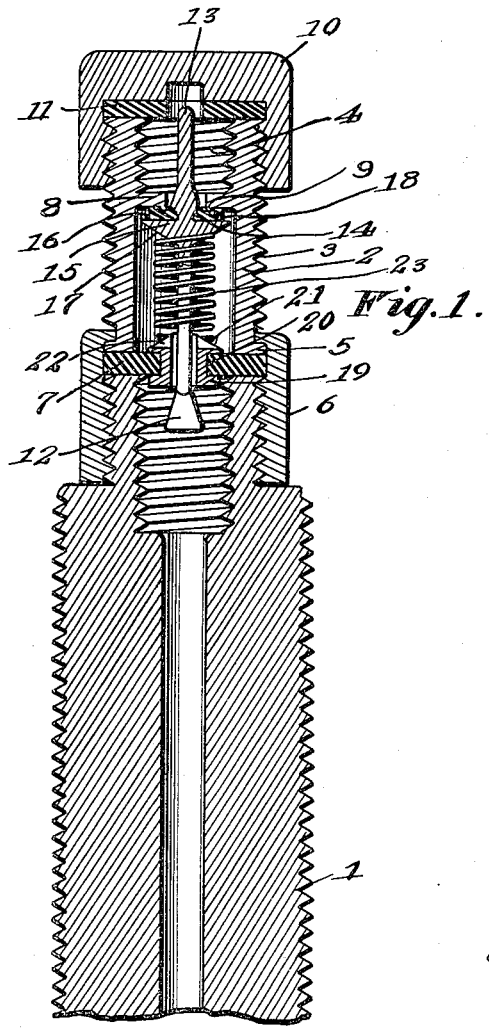
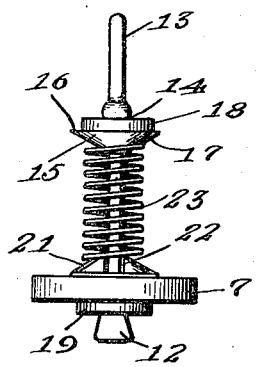
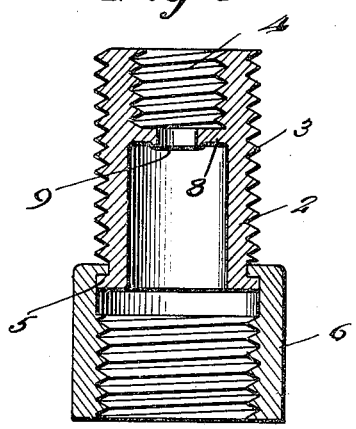
Witnesses
R. C. Thomas
Thomas E. Turpin
Inventor
William Goodwin
Mary Goodwin
By Victor J. Evans
Attorney

UNITED STATES PATENT OFFICE.

WILLIAM GOODWIN AND MARY GOODWIN, OF PETERBORO, ONTARIO, CANADA.

VALVE.

1,375,585.  Specification of Letters Patent.  Patented Apr. 19, 1921.

Application filed February 10, 1920. Serial No. 357,662.

*To all whom it may concern:*

Be it known that we, WILLIAM GOODWIN and MARY GOODWIN, citizens of Canada, residing at Peterboro, in the Province of Ontario and Dominion of Canada, have invented new and useful Improvements in Valves, of which the following is a specification.

The object of our present joint invention is the provision of a non-return valve, designed more especially for use in conjunction with inflatable tires, and embodying a simple and efficient construction and one that lends itself to the ready replacement of the rubber parts when the same are deteriorated or worn.

To the attainment of the foregoing, the invention consists in the improvement as hereinafter described and definitely claimed.

In the accompanying drawings, hereby made a part hereof:

Figure 1 is a diametrical section of our novel valve complete.

Fig. 2 is a detail view showing the spindle and the parts thereon as removed from the casing.

Fig. 3 is a diametrical section of the valve casing *per se.*

Similar numerals of reference designate corresponding parts in all of the views of the drawings.

Our novel valve is designed more especially, though not necessarily, for use on the exteriorly threaded inflation tube 1 of a tire, and comprises a casing section 2, exteriorly threaded at 3 and interiorly threaded at 4, the latter connection being designed for the provision of an inflating pump. At its inner end the said section 3 is provided with a flange 5 so as to permit of the swivel connection of a coupling nut 6 and avert distortion of the annular rubber joint washer 7. Interiorly of the casing section 2 and at an intermediate point on the length thereof is an annular flange 8 having at its inner edge an inwardly extending penetrating portion 9.

Threaded on the outer end portion of the casing section 2 is a removable cap 10 that contains a rubber washer 11 adapted to be crowded against the outer end of the casing section 3.

Extending through the annular flange 8 and also through the annular washer 7 is the spindle of the valve. The said spindle is provided at its inner end with a retaining enlargement 12, and at its outer end with a finger-piece 13, and at an intermediate point of its length and adjacent to the said finger-piece 13, the spindle is provided with an inwardly tapered portion 14 and a body portion 15, the latter being flat at its outer side 16 and conical at its inner side 17, whereby the said inner side is enabled to serve as a deflector in diverting the air under pressure radially away from the valve seat.

Arranged at the outer side of the body portion 15 and opposed to the penetrating portion 9 of the flange 8 is a washer 18 of rubber or analogous material; said washer 18 being of less diameter than the body portion 15 which avoids displacement of the outer edge of the washer from the flat side of the body portion and lessens liability of the air leaking past the valve seat. The tapered portion 14 of the spindle is advantageous, inasmuch as it tends to keep the washer 18 on the body portion 15 and against the flat side of the latter.

Loosely surrounding the spindle is a thimble 19, circumferentially grooved at 20 to receive the washer 7, and provided in its outer tapered portion 21 with a diametrical slot 22, designed to effectively prevent valve closure. As will be readily observed, the outer portion of the thimble 19 forms a tapered seat for the valve spring 23, and by reason of the taper maintains the spring in alinement with the spindle. Said thimble 19 also holds and prevents collapsing of the washer 7, the said washer being supported by the thimble up to the point where the washer contacts with the outer end of the tube 1. The thimble 19 further serves to afford a constantly open passage for air, and is adapted to serve as a stop for the inward movement of the spindle, inasmuch as the body portion 15 will bring up against the thimble 19 when it reaches the limit of its inward movement.

In the practical use of our novel valve, it will be apparent that the spindle is susceptible of being readily moved inward to unseat the valve and permit of the inward passage of air; and it will also be apparent that when the outer end of the spindle is relieved of pressure, the valve 18 will be promptly seated due to the combined action of the spring and the pressure of the air.

Our improved valve is further materially advantageous because of the facility with which the spindle and the parts connected therewith may be removed from the casing, it being simply necessary when the washers 18 and 7 are to be replaced with new washers, to press the spindle inwardly until the washer 7 is disengaged from the coupling nut 6, when the spindle and all of the parts thereon may be readily withdrawn from the casing. Then when a fresh washer 18 and a fresh washer 7 are associated with the spindle and the appurtenances thereof, the spindle so equipped may as readily be replaced in the casing.

Having described our invention, what we claim and desire to secure by Letters-Patent, is:

1. In a valve, the combination of a casing section, a coupling nut swiveled on the inner end of said casing section, an annular washer seated in the coupling nut with its outer edge portion removably held between the same and the casing section, a thimble having a circumferential groove receiving the inner edge portion of said washer and also having a central opening and an outwardly tapered outer portion and a slot in the latter, a spindle having an enlargement at its inner end and an enlargement at an intermediate point of its length, a spring surrounding the spindle and interposed between the thimble and said intermediate enlargement of the spindle, and packing about the spindle and on said enlargement and bearing against the casing section.

2. In a valve, the combination of a casing section, a spindle movable endwise through said casing section, an annular thimble loosely surrounding and retained on the spindle and having a conical outer side, a spring surrounding the spindle and interposed between an abutment thereon and the conical outer side of the thimble, a washer carried by the thimble and removably held against the inner portion of the casing whereby when said washer is displaced the spindle and the parts associated therewith may be removed through the open inner end of the casing, and a valve body carried by the spindle.

In testimony whereof we affix our signatures.

WILLIAM GOODWIN,
MARY GOODWIN.